US009618154B2

United States Patent
Uusitalo et al.

(10) Patent No.: US 9,618,154 B2
(45) Date of Patent: Apr. 11, 2017

(54) GEAR UNIT AND A METHOD FOR CONTROLLING A LUBRICATION PUMP OF A GEAR UNIT

(71) Applicant: MOVENTAS GEARS OY, Jyväskylä (FI)

(72) Inventors: Kari Uusitalo, Jyväskylä (FI); Jukka Elfström, Jyväskylä (FI)

(73) Assignee: MOVENTAS GEARS OY, Jyvaskyla (FI)

( * ) Notice: Subject to any disclaimer, the term of this patent is extended or adjusted under 35 U.S.C. 154(b) by 209 days.

(21) Appl. No.: 13/624,595

(22) Filed: Sep. 21, 2012

(65) Prior Publication Data
US 2013/0075198 A1 Mar. 28, 2013

(30) Foreign Application Priority Data
Sep. 22, 2011 (EP) .................................. 11182328

(51) Int. Cl.
*F16N 7/38* (2006.01)
*F16H 61/00* (2006.01)
(Continued)

(52) U.S. Cl.
CPC ......... *F16N 7/385* (2013.01); *F16H 57/0434* (2013.01); *F16H 59/72* (2013.01);
(Continued)

(58) Field of Classification Search
CPC .. F16H 59/72; F16H 61/0031; F16H 2312/14; F04B 2203/0207; F04B 2203/0209; F04B 2203/021
(Continued)

(56) References Cited

U.S. PATENT DOCUMENTS 5,310,020 A * 5/1994 Martin et al. .................. 184/6.3
5,634,530 A * 6/1997 Maekawa et al. ........... 184/6.12
(Continued)

FOREIGN PATENT DOCUMENTS

CN 201575285 U 9/2010
CN 201810502 U 4/2011
(Continued)

OTHER PUBLICATIONS

Search Report issued in corresponding Chinese Patent Application No. 201210449153.5 on Oct. 13, 2015 (in English).

*Primary Examiner* — Minh Truong
(74) *Attorney, Agent, or Firm* — Birch, Stewart, Kolasch & Birch, LLP

(57) ABSTRACT

A gear unit includes shafts for connecting to an external mechanical system, at least one gear stage between the shafts, a lubrication pump for circulating lubricating oil through the at least one gear stage and bearings of the gear unit, a temperature sensor for measuring temperature of the lubricating oil and supplying a temperature signal, an electrical motor for driving the lubrication pump, and an electrical device for controlling the electrical motor so that torque directed to the lubrication pump is below a torque limit. The torque limit is determined dynamically on the basis of the measured temperature of the lubricating oil. This arrangement makes it possible to protect the lubrication pump against mechanical faults during a cold start process so that an unnecessarily strict torque limitation, which would slow down the cold start process, can be avoided.

7 Claims, 2 Drawing Sheets

(51) Int. Cl.
  *F16H 59/72* (2006.01)
  *F16H 57/04* (2010.01)

(52) U.S. Cl.
  CPC .... *F16H 61/0031* (2013.01); *F04B 2203/021* (2013.01); *F04B 2203/0207* (2013.01); *F04B 2203/0209* (2013.01); *F16H 57/0413* (2013.01); *F16H 2312/14* (2013.01); *F16N 2250/08* (2013.01)

(58) Field of Classification Search
  USPC ....... 184/6.12, 6.28; 417/44.1, 45; 311/6.12, 311/6.28
  See application file for complete search history.

(56) References Cited

U.S. PATENT DOCUMENTS

| | | | |
|---|---|---|---|
| 5,927,073 A * | 7/1999 | Ishizaki et al. | 60/487 |
| 6,042,501 A * | 3/2000 | Yamamoto | 477/48 |
| 6,183,210 B1 * | 2/2001 | Nakamura | 417/222.1 |
| 7,349,814 B2 * | 3/2008 | Venkatachari et al. | 702/50 |
| 7,481,053 B2 * | 1/2009 | Kitano | B60K 6/48 60/329 |
| 2006/0120876 A1 * | 6/2006 | Kitano et al. | 417/42 |
| 2007/0274844 A1 * | 11/2007 | Jungerink | 417/326 |
| 2008/0135314 A1 * | 6/2008 | Motoike et al. | 180/65.2 |
| 2008/0303477 A1 * | 12/2008 | Patel | 318/802 |
| 2009/0324427 A1 * | 12/2009 | Tolbert et al. | 417/13 |
| 2011/0135499 A1 * | 6/2011 | Lee et al. | 417/44.1 |
| 2011/0204633 A1 | 8/2011 | Takayanagi | |
| 2012/0063920 A1 * | 3/2012 | Ikeda | 417/32 |
| 2012/0063922 A1 * | 3/2012 | Sano et al. | 417/44.1 |
| 2012/0132483 A1 * | 5/2012 | Conley et al. | 184/6.4 |
| 2012/0251354 A1 * | 10/2012 | Kogure | 417/410.1 |

FOREIGN PATENT DOCUMENTS

| | | |
|---|---|---|
| CN | 102401126 A | 4/2012 |
| EP | 2 428 704 A1 | 3/2012 |
| WO | WO 2009/037996 A1 | 3/2009 |

\* cited by examiner

GEAR UNIT AND A METHOD FOR CONTROLLING A LUBRICATION PUMP OF A GEAR UNIT

FIELD OF THE INVENTION

The invention relates to a gear unit and to a method for controlling a lubrication pump of a gear unit. Furthermore, the invention relates to a computer program for controlling a lubrication pump of a gear unit.

BACKGROUND

A lubrication system of a gear unit comprises typically a lubrication pump that is arranged to circulate lubricating oil through a gear stage or gear stages of the gear unit and through the bearings of the gear unit. As the viscosity of the lubricating oil is strongly dependent on temperature, the lubrication pump has to be designed and operated in way that the lubrication pump is not damaged even if the lubricating oil is cold and thereby its viscosity is relatively high.

In principle, it is possible to pre-heat the lubricating oil so that the lubricating oil is, at all circumstances, sufficiently warm to be pumped in the same way as during the normal use of the gear unit. However, the pre-heating so that the lubricating oil is also in cold start circumstances sufficiently warm to be pumped in the same way as in the normal use takes time and consumes energy before the gear unit is ready for use. Therefore, the lubrication pump is normally rotated with a smaller torque and speed in the cold start circumstances than in the normal use.

There is, however, a tradeoff between the time required for the cold start process and a fault risk and also wear of the lubrication pump so that higher upper limits of the torque and the rotational speed during the cold start process lead to a shorter cold start process but also to an increased fault risk and increased wear of the lubrication pump. In order to keep the fault risk as well as the wear of the lubrication pump at a sufficiently low level, a safety margin is needed when selecting the torque limit and the rotational speed limit to be used during the cold start process. This may, however, lead sometimes to a situation in which the temporal duration of the cold start process is unsatisfactorily long.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document we use the term gearwheel to refer to a cogged, rotating machine part. Two or more meshing gearwheels constitute a gear stage. The term gear as such refers in this document to a mechanical system having a first shaft and a second shaft, between which one or more gear stages provide speed and torque conversions and/or a change in a direction of a rotation axis. A gear unit comprises a gear proper and may comprise auxiliary augmenting systems, such as instrumentation, control, and lubrication arrangements.

In accordance with the first aspect of the present invention, a gear unit comprising:

a first shaft and a second shaft for connecting to an external mechanical system, at least one gear stage between the first and second shafts, a lubrication pump for circulating lubricating oil through the at least one gear stage and bearings of the gear unit, a temperature sensor for measuring temperature of the lubricating oil and supplying a temperature signal representative thereof, an electrical motor for driving the lubrication pump, and an electrical device for energizing and controlling the electrical motor, the electrical device being arranged to limit torque directed to the lubrication pump to be below a torque limit, wherein the electrical device is arranged to:

limit rotational speed of the lubrication pump to be below a speed limit simultaneously with limiting the torque directed to the lubrication pump to be below the torque limit, and increase the speed limit and decrease the torque limit in response to an increase of the temperature signal indicative on an increase of the temperature of the lubricating oil.

As the maximum allowable torque directed to the lubrication pump is changed in response to changes of the measured temperature of the lubricating oil and thereby the torque limit can be changed dynamically according to the measured temperature, it is possible to protect the lubrication pump against mechanical faults during a cold start process in a way that an unnecessarily strict torque limitation, which would slow down the cold start process, can be avoided. Hence, the present invention solves a technical problem which is present in many prior art gear units in which a fixed torque limit is used during a cold start process, and thereby the trade-off between the time required for the cold start process and the fault risk and wear of the lubrication pump is more inconvenient.

In a gear unit according to an exemplifying and advantageous embodiment of the invention, the electrical device is further arranged to control the electrical motor so that the rotational speed of the lubrication pump is below a speed limit, and to change the speed limit in response to changes of the temperature signal. In the gear unit according this embodiment of the present invention, both the maximum allowable torque and the maximum allowable rotational speed are determined on the basis of the measured temperature of the lubricating oil. This arrangement makes it possible to protect the lubrication pump against mechanical faults during a cold start process in a way that unnecessarily strict torque and speed limitations, which would slow down the cold start process, can be avoided.

The lubrication pump can be, for example but not necessarily, driven with an alternating current motor, e.g. an induction motor, fed with a static frequency converter. In this case, the torque limitation can be implemented with a current limitation and the speed limitation can be implemented with a frequency limitation.

In accordance with the second aspect of the present invention, there is provided a new method for controlling a lubrication pump of a gear unit. The method comprises:

measuring temperature of lubricating oil circulated by the lubrication pump, controlling an electrical motor driving the lubrication pump so that torque directed to the lubrication pump is below a torque limit, and changing the torque limit in response to changes of the measured temperature of the lubricating oil.

In accordance with the third aspect of the present invention, there is provided a new computer program for controlling a lubrication pump of a gear unit. The computer program comprises computer executable instructions for controlling a programmable processor to:

deliver a torque limit to an electrical system driving the lubrication pump, the torque limit indicating the maximum allowable torque directed to the lubrication pump, and change the torque limit in response to changes of a signal representative of measured temperature of lubricating oil.

A computer program product according to the invention comprises a non-volatile computer readable medium, e.g. a compact disc ("CD"), encoded with a computer program according to the invention.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that neither excludes nor requires the existence of unrecited features. The features recited in depending claims are mutually freely combinable unless otherwise explicitly stated.

BRIEF DESCRIPTION OF THE FIGURES

The exemplifying embodiments of the invention and their advantages are explained in greater detail below in the sense of examples and with reference to the accompanying drawings, in which.

DESCRIPTION OF THE EMBODIMENTS

Figure 1:
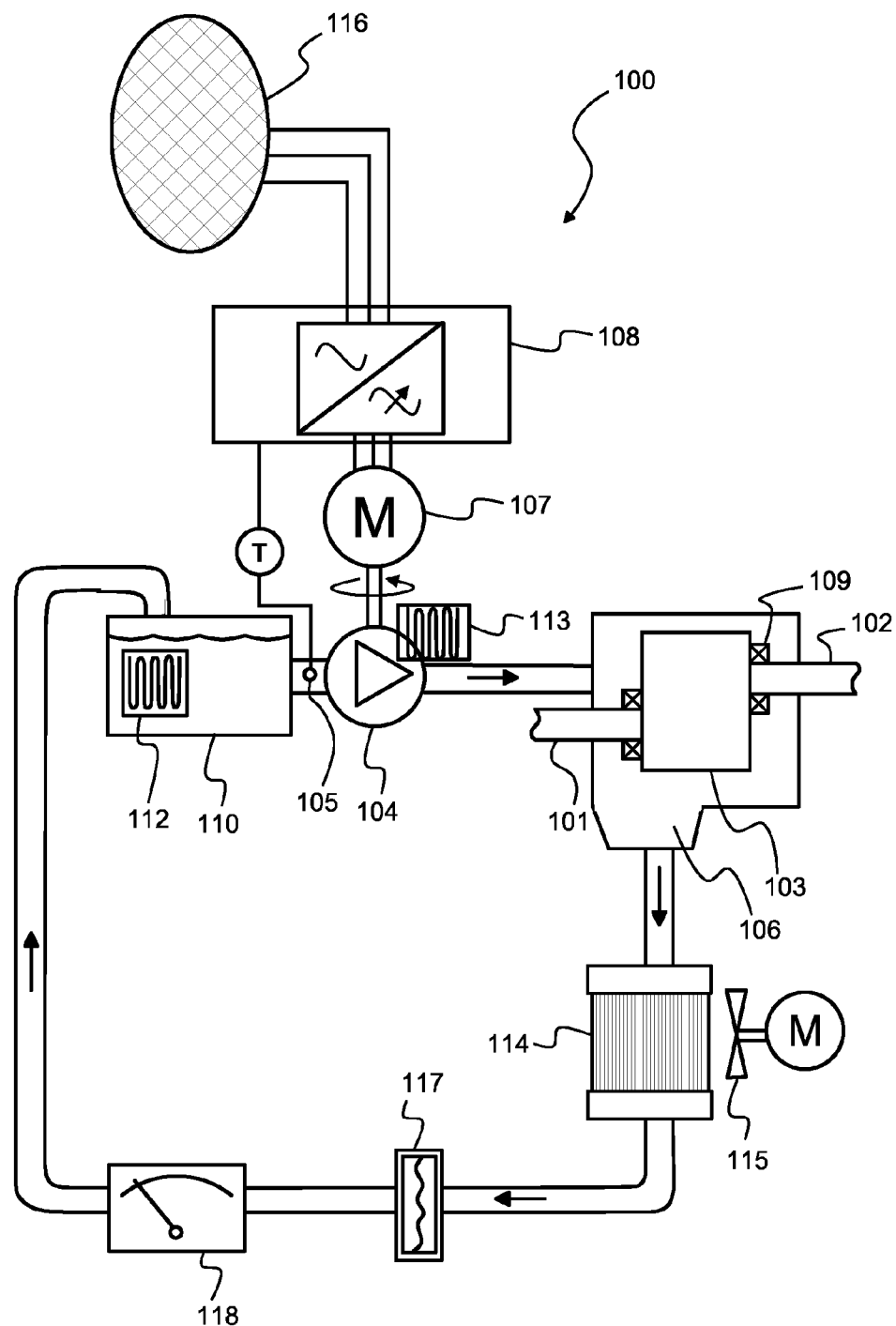
FIG. 1 shows a schematic illustration of a gear unit according to an embodiment of the invention.

FIG. 1 shows a schematic illustration of a gear unit 100 according to an advantageous, exemplifying embodiment of the invention. The gear unit comprises a first shaft 101 and a second shaft 102 for connecting to an external mechanical system. The external mechanical system may comprise, for example but not necessarily, a wind turbine that can be connected to the shaft 101 and a generator that can be connected to the shaft 102, i.e. the gear unit can be for example a gear unit suitable for a wind power application. The gear unit comprises at least one gear stage 103 between the shafts 101 and 102. The at least one gear stage may comprise, for example, one or more planet gear stages, one or more cylindrical gear stages and/or one or more conical gear stages, or a combination of gear stages of the kind mentioned above. The gear unit comprises a lubrication pump 104 for circulating lubricating oil through the at least one gear stage and bearings 109 of the gear unit. The lubrication pump can be, for example, a gear type pump. In the exemplifying case shown in FIG. 1, the gear unit comprises an oil tank 110 that constitutes a part of a circulation path of the lubricating oil. It is also possible that there is an oil sump 106 that constitutes, instead of or in addition to the oil tank 110, a reservoir for the lubricating oil. The gear unit comprises a temperature sensor 105 for measuring the temperature of the lubricating oil and supplying a temperature signal representative of the measured temperature. The temperature sensor is preferably arranged to measure the temperature of the lubricating oil from an inlet of the lubrication pump 104. However, it is also possible to measure the temperature from, for example, the oil tank 110. Furthermore, it is also possible to measure the temperature of the lubricating oil in an indirect way by measuring the temperature of the inlet tube of the lubrication pump or by measuring the temperature of the lubrication pump itself. The gear unit comprises an electrical motor 107 for driving the lubrication pump 104, and an electrical device 108 for energizing and controlling the electrical motor so that the torque directed to the lubrication pump is below a torque limit. The electrical device 108 is arranged to change the torque limit in response to changes of the temperature signal so that the torque limit is changed dynamically according to the measured temperature of the lubricating oil. The rotational speed of the lubrication pump depends on the torque-speed characteristics of the lubrication pump at the prevailing temperature and pressure of the lubricating oil being pumped. The rotational speed of the lubrication pump 104 is preferably limited to be below a speed limit.

In a gear unit according to an embodiment of the invention, the electrical device 108 is arranged to increase the torque limit in response to an increase of the temperature of the lubricating oil when the temperature of the lubricating oil is below a point at which the lubrication ability of the lubricating oil is at its best, i.e. the increase of the lubrication ability due to the increase of the temperature is utilized by increasing the torque so as to shorten the cold start process.

In a gear unit according to an embodiment of the invention, the electrical device 108 is arranged to change the speed limit in response to changes of the temperature signal. Hence, both the maximum allowable torque and the maximum allowable rotational speed can be changed dynamically according to the measured temperature of the lubricating oil.

In a gear unit according to another embodiment of the invention, the electrical device 108 is arranged to increase the speed limit and decrease the torque limit in response to an increase of the temperature of the lubricating oil. Therefore, the upper limit of the mechanical power directed to the lubrication pump can be kept substantially constant when the lubricating oil is warmed up. The fact that there is an upper limit of the mechanical power can be utilized when dimensioning the electrical motor 107 and the electrical device 108.

In conjunction with gear units according to certain embodiments of the invention, the temperature range of the lubricating oil is divided into a plurality of successive sub-ranges. In a gear unit according to an embodiment of the invention, the electrical device 108 is arranged to use a sub-range specific torque limit for each of the sub-ranges. In a gear unit according to an embodiment of the invention, the electrical device 108 is arranged to use a sub-range specific torque limit and also a sub-range specific speed limit for each of the sub-ranges. The successive sub-ranges can be for example: under −10° C., −10° C. . . . +10° C., +10° C. . . . +40° C., over +40° C.

In a gear unit according to an embodiment of the invention, the electrical device 108 is arranged to activate an oil-heater element 112 for warming up the lubricating oil when the measured temperature of the lubricating oil is below a first pre-determined temperature limit, e.g. +40° C.

In a gear unit according to an embodiment of the invention, the electrical device 108 is arranged to activate the oil-heater element 112 for warming up the lubricating oil and also a pump-heater element 113 for warming up the lubrication pump 104 when the measured temperature of the lubricating oil is below a second pre-determined temperature limit, e.g. −10° C., that is lower than the first temperature limit.

In a gear unit according to an embodiment of the invention, the electrical device 108 is arranged to activate a blower 115 of an oil-cooler element 114 for cooling the lubricating oil when the measured temperature of the lubricating oil is above a third pre-determined temperature limit, e.g. +50° C., that is higher than the first and second temperature limits.

In a gear unit according to an embodiment of the invention, the electrical motor 107 is an alternating current motor and the electrical device 108 comprises a frequency converter arranged to supply electrical energy to the electrical motor. The alternating current motor can be, for example, a three-phase induction motor. In the exemplifying case shown in FIG. 1, the electrical device 108 is supplied by a three-phase electrical power network 116. The frequency converter can be arranged to implement the limitation of the torque so that the amplitude or the effective value, e.g. the root mean square ("RMS"), of the current of the electrical motor is below a current limit and to implement the limitation of the rotational speed of the lubrication pump so that the frequency of the supply voltage of the electrical motor is below a frequency limit. A more accurate control of the torque can be achieved when the frequency converter is arranged to apply a vector control principle in which both the amplitudes and the instantaneous phases of the voltages and currents of the electrical motor are controlled instead of controlling only the amplitudes and the frequency. It is as well possible that the electrical motor 107 is a direct current ("DC") motor in which case the electrical device 108 may comprise e.g. a thyristor bridge for energizing and controlling the direct current motor.

A gear unit according to an embodiment of the invention comprises a filter element 117 for removing impurities from the lubricating oil.

A gear unit according to an embodiment of the invention comprises a sensor element 118 for monitoring the condition of the lubricating oil. The sensor element can be responsive, for example, to the purity degree of the lubricating oil and/or the water content of the lubricating oil.

Figure 2:
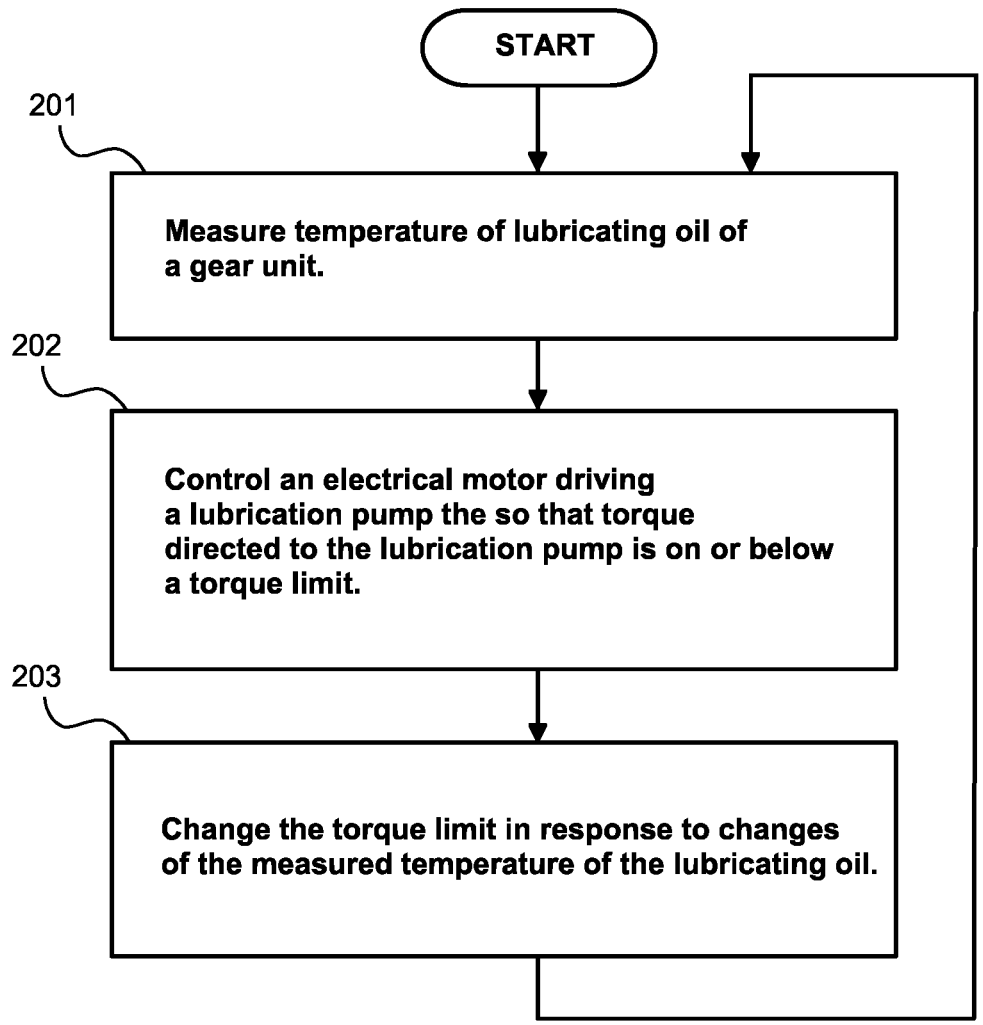
FIG. 2 shows a flow chart of a method according to an embodiment of the invention for controlling a lubrication pump of a gear unit.

FIG. 2 shows a flow chart of a method according to an embodiment of the invention for controlling a lubrication pump of a gear unit. The method comprises:

action 201: measuring temperature of lubricating oil circulated by the lubrication pump, action 202: controlling an electrical motor driving the lubrication pump so that the torque directed to the lubrication pump is below a torque limit, and action 203: changing the torque limit in response to changes of the measured temperature of the lubricating oil.

A method according to an embodiment of the invention comprises increasing the torque limit in response to an increase of the temperature of the lubricating oil when the temperature of the lubricating oil is below a point at which the lubrication ability of the lubricating oil is at its best, i.e. the increase of the lubrication ability due to the increase of the temperature is utilized by increasing the torque so as to shorten the cold start process.

A method according to an embodiment of the invention comprises controlling the electrical motor so that the torque directed to the lubrication pump is below the torque limit and the rotational speed of the lubrication pump is below a speed limit, and changing the torque limit and the speed limit in response to changes of the measured temperature of the lubricating oil.

In a method according to an embodiment of the invention, the speed limit is increased and the torque limit is decreased in response to an increase of the temperature of the lubricating oil. Therefore, the upper limit of the mechanical power directed to the lubrication pump can be kept substantially constant when the lubricating oil is warmed up.

In a method according to an embodiment of the invention, a range of the temperature of the lubricating oil is divided into a plurality of successive sub-ranges, and a sub-range specific torque limit is used for each of the sub-ranges.

In a method according to an embodiment of the invention, the range of the temperature of the lubricating oil is divided into the plurality of the successive sub-ranges, and the sub-range specific torque limit and a sub-range specific speed limit are used for each of the sub-ranges.

In a method according to an embodiment of the invention, the electrical motor is an alternating current motor and the torque is limited by limiting the amplitude or the effective value of the current of the electrical motor to be below a current limit, and the rotational speed of the lubrication pump is limited by limiting the frequency of the supply voltage of the electrical motor to be below a frequency limit.

In a method according to an embodiment of the invention, the temperature of the lubricating oil is measured from an inlet of the lubrication pump.

A computer program according to an embodiment of the invention comprises software modules for controlling a lubrication pump of a gear unit. The software modules comprise computer executable instructions for controlling a programmable processor to:

deliver a torque limit to an electrical system driving the lubrication pump, the torque limit indicating the maximum allowable torque directed to the lubrication pump, and change the torque limit in response to changes of a signal representative of measured temperature of lubricating oil.

The software modules can be, for example, subroutines and functions generated with a suitable programming language.

A computer program product according to an embodiment of the invention comprises a computer readable medium, e.g. a compact disc ("CD"), encoded with a computer program according to an embodiment of the invention.

A signal according to an embodiment of the invention is encoded to carry information defining a computer program according to an embodiment of the invention.

The specific examples provided in the description given above should not be construed as limiting. Therefore, the invention is not limited merely to the embodiments described above.

What is claimed is:

1. A gear unit comprising:
    a first shaft and a second shaft for connecting to an external mechanical system,
    at least one gear stage between the first and second shafts,
    a lubrication pump for circulating lubricating oil through the at least one gear stage and bearings of the gear unit,
    a temperature sensor for measuring temperature of the lubricating oil and supplying a temperature signal representative thereof,
    an electrical motor for driving the lubrication pump, and
    an electrical device for energizing and controlling the electrical motor, the electrical device limiting torque directed to the lubrication pump is below a torque limit, wherein the electrical device:

limits rotational speed of the lubrication pump to be below a speed limit simultaneously with limiting the torque directed to the lubrication pump to be below the torque limit, and increases the speed limit and decreases the torque limit at a rate where an upper limit of a mechanical power directed to the lubrication pump is kept substantially constant in response to an increase of the temperature signal indicative on an increase of the temperature of the lubricating oil.

2. A gear unit according to claim 1, wherein a range of the temperature signal comprises a plurality of successive sub-ranges, and the electrical device is arranged to use a sub-range specific torque limit for each of the sub-ranges.

3. A gear unit according to claim 2, wherein the successive sub-ranges correspond to the following temperature ranges: under −10° C., −10° C. . . . +10° C., +10° C. . . . +40° C., over +40° C.

4. A gear unit according to claim 1, wherein the electrical motor is an alternating current motor and the electrical device comprises a frequency converter arranged to supply electrical energy to the electrical motor.

5. A gear unit according to claim 4, wherein the frequency converter is arranged to limit the torque so that an amplitude of current of the electrical motor is below a current limit, and to limit rotational speed of the lubrication pump so that a frequency of a supply voltage of the electrical motor is below a frequency limit.

6. A gear unit according to claim 1, wherein the temperature sensor is arranged to measure the temperature of the lubricating oil from an inlet of the lubrication pump.

7. A gear unit according to claim 1, wherein a range of the temperature signal comprises a plurality of successive sub-ranges, and the electrical device is arranged to use a sub-range specific torque limit for each of the sub-ranges.

* * * * *